Patented Sept. 6, 1938

2,129,135

UNITED STATES PATENT OFFICE 2,129,135

RUBBER COMPOSITION AND METHOD OF PRESERVING RUBBER

Webster N. Jones, Pittsburgh, Pa., assignor to The B. F. Goodrich Company, New York, N. Y., a corporation of New York No Drawing. Original application January 22, 1931, Serial No. 510,514. Divided and this application August 11, 1936, Serial No. 95,427

11 Claims. (Cl. 18—50)

This invention relates to the art of rubber manufacture, and particularly to the preparation of rubber compositions which resist deterioration due to aging or exposure to the atmosphere. It has long been known that such deterioration can be greatly retarded by treating the rubber either before or after vulcanization with certain substances known as age-resisters or antioxidants. The chief object of this invention, then, is to provide a new and superior class of antioxidants for rubber.

The substances which are employed as antioxidants according to this invention are all tertiary aromatic amines containing two amino groups, and specifically compounds in which two tertiary amino groups are attached to a single aromatic nucleus. The preferred compounds are those in which the two amino groups contain both aromatic and aliphatic substituents. The presence of either strongly basic or acidic groupings is undesirable, and preferably the aromatic nucleus to which the two amino groups are attached, as well as the four substituents on the amino groups, should be hydrocarbon in nature, that is, consist solely of carbon and hydrogen. Compounds in which the tertiary amino groups form part of a ring structure are excluded, for heterocyclic nitrogen atoms do not react in the same manner as ordinary amino nitrogens, nor exhibit the peculiar properties which make the compounds of this invention so valuable.

For example, the following symmetrically substituted tertiary amino compounds are typical members of the class of substances outlined above: tetramethyl p-phenylene diamine, tetramethyl o-phenylene diamine, tetrabenzyl p-phenylene diamine, diphenyl dimethyl p-phenylene diamine, tetraphenyl p-phenylene diamine, tetramethyl m-toluylene diamine, and tetramethyl naphthylene diamine. It will be understood, however, that similar unsymmetrical compounds may likewise be employed with good effect.

Any one or a mixture of several of the above-enumerated compounds or of other equivalent compounds falling within the same class may be incorporated into rubber with good effect on its age-resisting properties. For example, from ¼ to 5% of such an antioxidant may be mixed with the rubber before vulcanization, the antioxidant having substantially no accelerating effect and therefore ordinarily not necessitating an adjustment of vulcanizing conditions. Alternatively the antioxidant may be applied to the surface of crude or vulcanized rubber, say in the form of a powder, paste or solution. Rubber so treated resists the deteriorating influence of age and exposure to the elements far better than similar untreated rubber.

As a specific example of one embodiment of the method of this invention, a typical tire tread composition was prepared containing: blended plantation rubbers approximately 100 parts by weight, sulfur 5, 5 parts, zinc oxide 30 parts, gas black 40 parts, mineral rubber 10 parts, palm oil 5 parts, and hexamethylene tetramine 0.75 part, as well as 0.95 part (½% of the weight of the composition) of tetrabenzyl p-phenylene diamine:

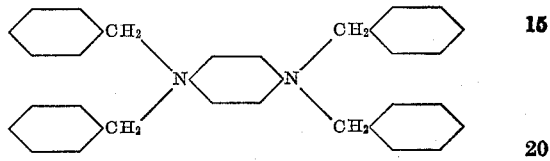

After thorough mixing the composition was vulcanized in a mold for 45 minutes at 145° C. (294° F.) to produce an optimum cure. After accelerated aging for a week in the Geer oven in a constantly renewed stream of air at a temperature of 70° C. (158° F.) the composition retained two thirds of its original strength, whereas the same composition without the tetrabenzyl p-phenylene diamine lost fully half its original strength.

It is evident from this example that rubber compositions containing even small proportions of the antioxidants of this invention resist deterioration far more effectively than similar untreated compositions. Any of the compounds enumerated above may be employed with similar results.

Obviously, the practice of this invention is not limited to the specific composition given above, such composition being merely illustrative of one manner of employing the antioxidants of this invention. The antioxidants may be employed in conjunction with other known antioxidants, or with other vulcanizing agents or accelerators than those here specifically disclosed. The proportions of the constituents may be varied, or other substances may be substituted generally therefor, since this invention is applicable to pure rubber or rubber compositions of the most varied nature.

It is to be understood that the term "treating" as employed in the appended claims is used in a generic sense to include either the incorporation of the antioxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers, and like products, whether or not admixed with fillers, pigments, vulcanizing or accelerating agents.

This application is a division of my copending application Serial No. 510,514 filed January 22, 1931, now Patent 2,072,596.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a compound consisting of two di-hydrocarbon substituted amino groups attached to a single aromatic hydrocarbon nucleus.

2. The method of preserving rubber which comprises treating rubber with tetramethyl p-phenylene diamine.

3. The method of preserving rubber which comprises treating rubber with a compound consisting of two di-aromatic-hydrocarbon substituted amino groups attached to an otherwise unsubstituted benzene nucleus.

4. The method of preserving rubber which comprises treating rubber with tetrabenzyl p-phenylene diamine.

5. The method of preserving rubber which comprises treating rubber with tetraphenyl p-phenylene diamine.

6. A rubber composition comprising rubber and a compound consisting of two di-hydrocarbon substituted amino groups attached to a single aromatic hydrocarbon nucleus.

7. A rubber composition comprising rubber and a compound consisting of two di-hydrocarbon substituted amino groups attached to an otherwise unsubstituted benzene nucleus.

8. A rubber composition comprising rubber and a compound consisting of two diaromatic-hydrocarbon substituted amino groups attached to a single otherwise unsubstituted aromatic nucleus.

9. A rubber composition comprising rubber and tetramethyl p-phenylene diamine.

10. A rubber composition comprising rubber and tetrabenzyl p-phenylene diamine.

11. A rubber composition comprising rubber and tetraphenyl p-phenylene diamine.

WEBSTER N. JONES.